J. JAFFE.
MEASURING DEVICE FOR SPECTACLES AND EYEGLASSES.
APPLICATION FILED JUNE 21, 1910.
993,252.
Patented May 23, 1911.
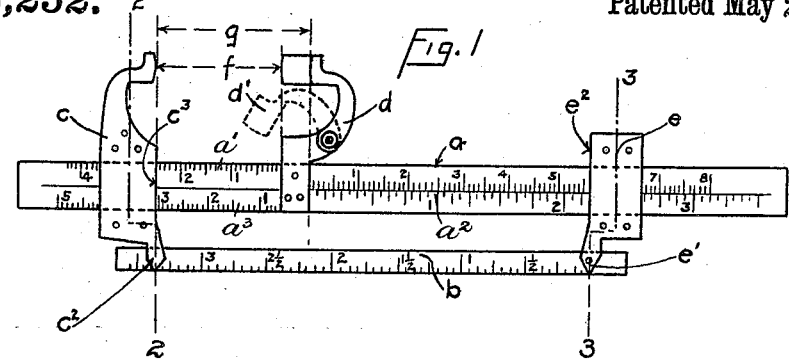
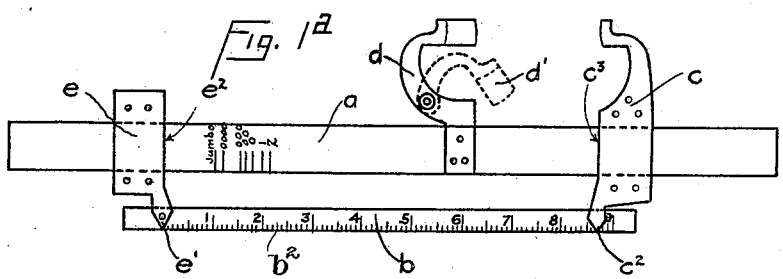
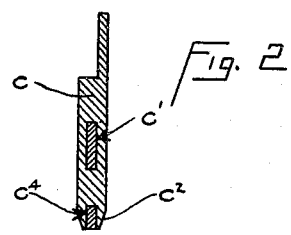
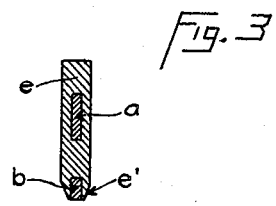
WITNESSES:
INVENTOR
Jacob Jaffe
BY
ATTORNEY

UNITED STATES PATENT OFFICE.

JACOB JAFFE, OF NEW YORK, N. Y.

MEASURING DEVICE FOR SPECTACLES AND EYEGLASSES.

993,252.

Specification of Letters Patent. Patented May 23, 1911.

Application filed June 21, 1910. Serial No. 568,216.

*To all whom it may concern:*

Be it known that I, JACOB JAFFE, a citizen of the United States of America, residing at New York, in the county of New York and State of New York, have invented certain new and useful Improvements in Measuring Devices for Spectacles and Eyeglasses, of which the following is a specification.

My invention relates to improvements in lens-measuring devices by which to ascertain the size of lens needed in an eyeglass or spectacle.

The object of my device is to automatically indicate the exact size of lens for a given width of bridge of nose, and distance between the pupils of the eyes. I attain this object by the device illustrated in the accompanying drawing, in which:

Figure 1 is the front view of the entire device; Fig. 1$^a$ is the back view; Fig. 2, a cross-section of the device through 2 and 2 in Fig. 1 and perpendicular to the bars $a$ and $b$; Fig. 3, a cross-section through 3 and 3 in Fig. 1 and perpendicular to $a$ and $b$.

With reference to the drawing $a$ denotes a bar which on both faces is provided with various scales, in inches or millimeters, or both, namely scales $a^1$, $a^2$, and $a^3$. Stationarily fixed to said bar between the scales $a^1$ and $a^2$ is a curved finger $d$ to which a correspondingly curved portion $d^1$ is pivoted, for the purpose set forth below. Parallel to said bar $a$ is a second bar $b$ having also on both faces inch or millimeter scales $b^1$. This second bar has fixed to it a recessed projection or plate $e$, through which bar $a$ is adapted to slide longitudinally. The end of the plate at which it is fixed to the bar $b$ is pointed as at $e^1$ and is in a line with the inner edge $e^2$ of the plate $e$. A piece $c$ provided with a recess $c^1$ and formed at its lower end with a pointer $c^2$ that lies in a line with the inner edge $c^3$ of the piece $c$ is slidably arranged on the bar $a$ and in its pointed end $c^2$ has a slit $c^4$ whereby it also engages the second bar $b$. The opposite end of the piece $c$ which projects beyond the outer longitudinal edge of bar $a$ is shaped in conformity with finger $d$, so that both fingers $d$ and $c$ are directed toward one another and constitute the means for measuring the base of the bridge.

The mode of applying the device for determining the size of lens for a given base of bridge, and also the distance between the pupils of the eyes is as follows: By placing the device over the nose the slide $c$ is shifted along bar $a$. The distance $f$ indicates then the base of the bridge for the spectacle and can be read off on scale $a^1$. Thereupon the device is turned around and bar $b$ is held over the bridge point of the nose, so that the pointer $c^2$ coincides with the pupil of the eye toward which it projects. Now the slide $e$ with the bar $b$ is shifted along bar $a$ until pointer $e^1$ coincides with the pupil of the other eye. The distance between the two pointers will then indicate the pupilary distance which can be read off on scale $b^1$ of bar $b$. The size of the lens is then automatically obtained, the same being the distance between the opposite edges of parts $d$ and $e$ on the bar $a$, which can be read off on scale $a^2$ (in inches or millimeters) or the "size of eye" can be directly read off as shown in Fig. 1$^a$. Supposing the base of the bridge is unknown, then to determine the lens, it would require to measure the distance between the inner ends of the studs of the mounting and the pupilary distance. To do this the pivoted finger $d^1$ is turned down, as indicated by dotted lines in Figs. 1 and 2, and the operation is carried out in the same way as for measuring the base of the bridge and pupilary distance in the above described manner. The distance $g$ will indicate the distance between the inner ends of the studs of the mounting and the distance between the inner edges of parts $d$ and $e$ on the bar $a$ will be the size of the lens.

I am aware that prior to my invention there have been in use devices to measure bases of bridge and the distance between pupils of the eyes. I, therefore, do not claim these; but, What I do claim is:

1. In the herein described instrument, the combination of two parallel sliding bars, pupil pointers and base indexes, said sliding bars being so graduated and the said pupil pointers and indexes being so arranged that by the adjustment of the pupil pointers for measuring the pupilary distances and by the adjustment of the base indexes for measuring the bridge distance, the two distances are automatically adjusted on the scales and give the size of the required lens.

2. In the herein described instrument, the combination of two parallel sliding bars, two pupil pointers, of which one is fixed to one of said bars and freely slides on the other and the other pointer is loose and freely slides on both of said bars, and base indexes, of which one is fixed to the other sliding bar and the other index is formed on the loose pupil pointer, the sliding bars being so graduated that by the adjustment of the pupil pointers for measuring the pupilary distances and by the adjustment of the said base indexes for measuring the bridge distance, the two distances are automatically adjusted on the scales of the sliding bars and give the size of the required lens.

3. In the herein described instrument, the combination of two parallel sliding bars, a pupil pointer fixed to one of said bars, a loose pupil pointer formed with a base index, and a second base index fixed to the other sliding bar and formed with a tilting part, to allow of the measurement of the distance between the inner ends of the studs of the mounting.

In testimony whereof I affix my signature in presence of two witnesses.

JACOB JAFFE.

Witnesses:
MORRIS JAFFE,
CHARLES H. LEVY.

Copies of this patent may be obtained for five cents each, by addressing the "Commissioner of Patents, Washington, D. C."